United States Patent
Mizoguchi et al.

(10) Patent No.: US 11,910,033 B2
(45) Date of Patent: Feb. 20, 2024

(54) STREAMING SERVER, TRANSMISSION METHOD, AND PROGRAM

(71) Applicant: KABUSHIKI KAISHA TOSHIBA, Tokyo (JP)

(72) Inventors: Yu Mizoguchi, Kanagawa (JP); Shunichi Gondo, Tokyo (JP); Mika Minematsu, Tokyo (JP); Tomonori Maegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/682,801

(22) Filed: Feb. 28, 2022

(65) Prior Publication Data
US 2023/0007315 A1  Jan. 5, 2023

(30) Foreign Application Priority Data
Jul. 1, 2021 (JP) ................................ 2021-110018

(51) Int. Cl.
 *H04N 21/234* (2011.01)
 *H04N 21/845* (2011.01)
(52) U.S. Cl.
 CPC ....... *H04N 21/234* (2013.01); *H04N 21/8456* (2013.01)
(58) Field of Classification Search
 None
 See application file for complete search history.

(56) References Cited

U.S. PATENT DOCUMENTS

| | | | | |
|---|---|---|---|---|
| 8,495,675 B1* | 7/2013 | Philpott | ........... | H04N 21/26258 725/62 |
| 8,863,182 B1* | 10/2014 | Sharifi | ................ | H04N 21/812 725/38 |
| 2012/0047542 A1* | 2/2012 | Lewis | .............. | H04N 21/44016 725/97 |
| 2012/0179788 A1* | 7/2012 | McGowan | ......... | H04N 21/6582 709/219 |
| 2013/0282915 A1* | 10/2013 | Patel | ...................... | H04L 65/60 709/231 |
| 2015/0296269 A1 | 10/2015 | Tokumo et al. | | |

(Continued)

FOREIGN PATENT DOCUMENTS

| | | |
|---|---|---|
| JP | 2018-186524 A | 11/2018 |
| JP | 2020-72461 A | 5/2020 |

OTHER PUBLICATIONS

R. Pantos, Ed., "HTTP Live Streaming 2nd Edition," IETF RFC 8216 (Obsolete), https://tools.ietf.org/html/draft-pantos-hls-rfc8216bis-08, 83 pages (Oct. 29, 2020).

(Continued)

*Primary Examiner* — Alexander Q Huerta
(74) *Attorney, Agent, or Firm* — Finnegan, Henderson, Farabow, Garrett & Dunner, LLP

(57) ABSTRACT

According to one embodiment, a streaming server that outputs chunk data obtained by dividing picture data into chunks as streaming data, comprises a chunk length determination unit, and a data generation unit. The chunk length determination unit that calculates a chunk length which is a time length of the chunk, and the data generation unit that generates the chunk data by dividing the picture data into the chunks in accordance with the chunk length.

14 Claims, 9 Drawing Sheets

(56) References Cited

U.S. PATENT DOCUMENTS

| | | | |
|---|---|---|---|
| 2015/0350622 A1* | 12/2015 | Pantos | ............... H04N 21/8455 |
| | | | 386/346 |
| 2018/0062910 A1* | 3/2018 | Broome | ........... H04N 21/23439 |
| 2020/0145685 A1 | 5/2020 | Gondo | |
| 2020/0322567 A1* | 10/2020 | Liu | ...................... H04N 19/154 |
| 2021/0076094 A1* | 3/2021 | Pikus | ............. H04N 21/234363 |
| 2021/0099739 A1* | 4/2021 | Weil | ................. H04N 21/23439 |

OTHER PUBLICATIONS

R. Pantos, Ed., et al., "HTTP Live Streaming," IETF RFC 8216, https://tools.ietf.org/html/rfc8216, DOI: 10.17487/RFC8216, 60 pages (2017).

* cited by examiner

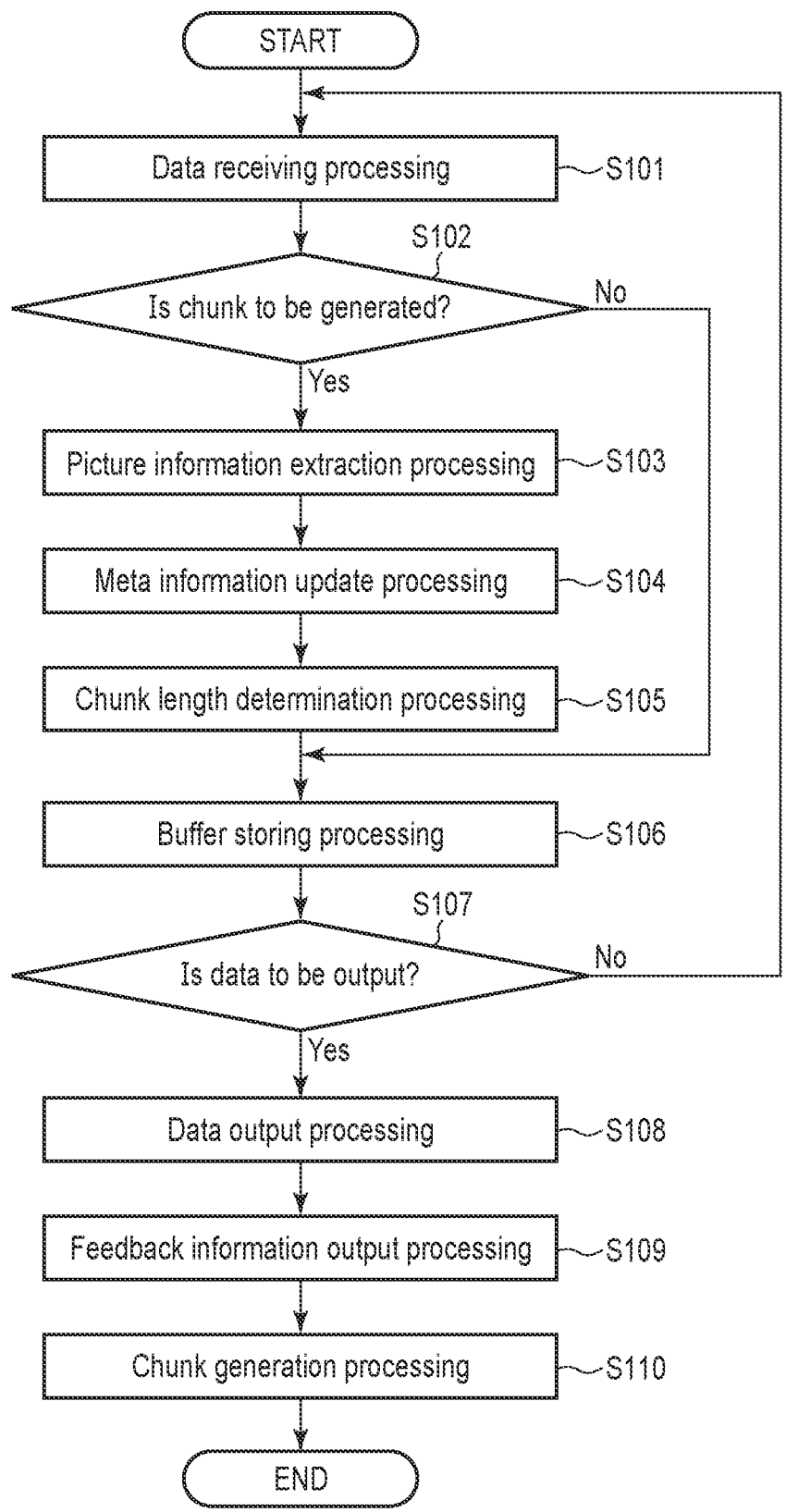
F I G. 5

STREAMING SERVER, TRANSMISSION METHOD, AND PROGRAM

CROSS-REFERENCE TO RELATED APPLICATIONS

This application is based upon and claims the benefit of priority from Japanese Patent Application No. 2021-110018, filed Jul. 1, 2021, the entire contents of which are incorporated herein by reference.

FIELD

Embodiments described herein relate generally to a streaming server, a transmission method, and a program for video distribution.

BACKGROUND

Low-latency video streaming over the Internet is implemented by a method based on the Common Media Application Format (CMAF), which is a low-latency media format specification. In the CMAF, a server divides transmission data into chunks, and a chunk length is generally set based on time and to a fixed length.

However, since picture data that is encoded video frame data generally has a different data size for each frame, a large delay time may occur in reception by a viewer depending on the picture data. The influence may increase depending on factors such as the resolution and frame rate of the distribution program.

An object of the present invention is to provide a streaming server, a transmission method, and a program for streaming video distribution that determine a chunk length for each chunk of streaming data.

BRIEF DESCRIPTION OF THE DRAWINGS

FIG. 5 is a flowchart illustrating a processing operation example of a streaming data generation unit according to a first embodiment.

DETAILED DESCRIPTION

In general, according to one embodiment, a streaming server that outputs chunk data obtained by dividing picture data into chunks as streaming data, comprises a chunk length determination unit, and a data generation unit.

The chunk length determination unit that calculates a chunk length which is a time length of the chunk, and the data generation unit that generates the chunk data by dividing the picture data into the chunks in accordance with the chunk length.

An embodiment will be described with reference to the drawings below.

Figure 1:
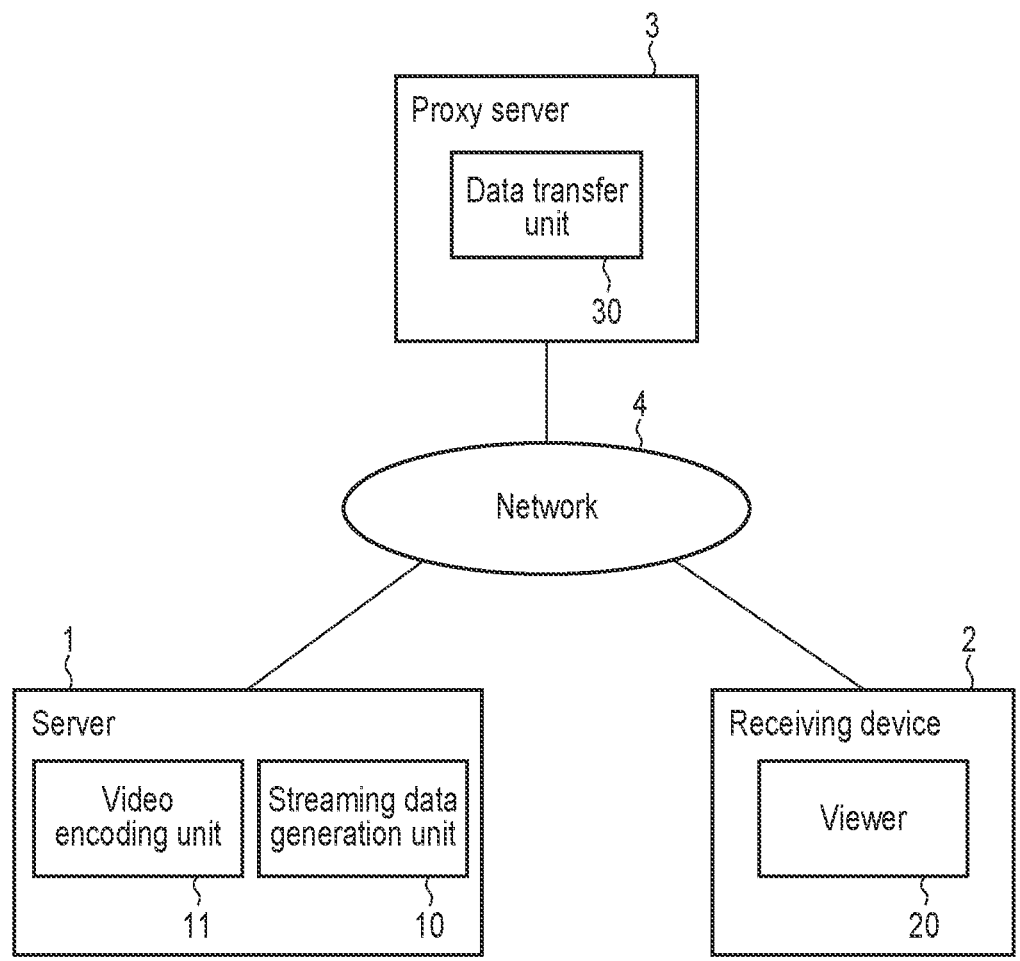
FIG. 1 is a functional block diagram illustrating a configuration example of a system according to an embodiment.

FIG. 1 is a functional block diagram illustrating a configuration example of a system according to an embodiment.

A server 1 is a streaming server that provides streaming content (which may include video, audio, and the like) to a client connected to a network 4, and may include, for example, a CPU, a memory, a computer having a communication function, a cloud, and the like. For example, the server 1 may receive video data (which may include audio data or the like) from a live camera (not illustrated) or the like connected to the network 4, output the received video data to the network 4 as streaming data, and provide the video data to a receiving device 2 (client) connected to the network 4. The server 1 may include a video encoding unit 11 for encoding (information source compression encoding) the received video data, and includes a streaming data generation unit 10 for generating streaming data from the encoded video data and outputting the streaming data to the network 4. The server 1 may receive encoded video data corresponding to the encoded data output from the video encoding unit 11 from the outside, directly input the received encoded video data to the streaming data generation unit 10, and generate and output streaming data.

The receiving device 2 is a client that receives the streaming data output from the server 1, and may include, for example, a CPU, a memory, a computer having a communication function, and the like. As long as the receiving device 2 has a computer function, a communication function capable of being connected to the network 4, and the like, the receiving device 2 may be a terminal such as a television receiving device of digital broadcasting or a smartphone, for example. The receiving device 2 can output (present) the streaming content obtained by decoding the received streaming data from a viewer 20. The user can view the streaming content by the viewer 20. The viewer 20 is, for example, application software for receiving and displaying and outputting streaming content, and is installed in the receiving device 2. The viewer 20 has a function of a decoder of streaming data, and may be, for example, Media Source Extensions of a browser standard API.

A proxy server 3 is, for example, a computer having a CPU, a memory, a communication function, and the like connected to the network 4, and may have a cache function, a data transfer function, and the like. The data transfer unit 30 may receive streaming data output from the server 1 via the network 4, store the streaming data in a memory (not illustrated) or the like, and output the stored streaming data to the receiving device 2 in response to a request.

The network 4 is a network to which the server 1, the receiving device 2, the proxy server 3, and the like are connected and capable of communicating, and is, for example, the Internet. The network 4 is not limited to the Internet, and may be a network including a plurality of different networks regardless of wired or radio as long as each device can communicate with each other.

Figure 2:
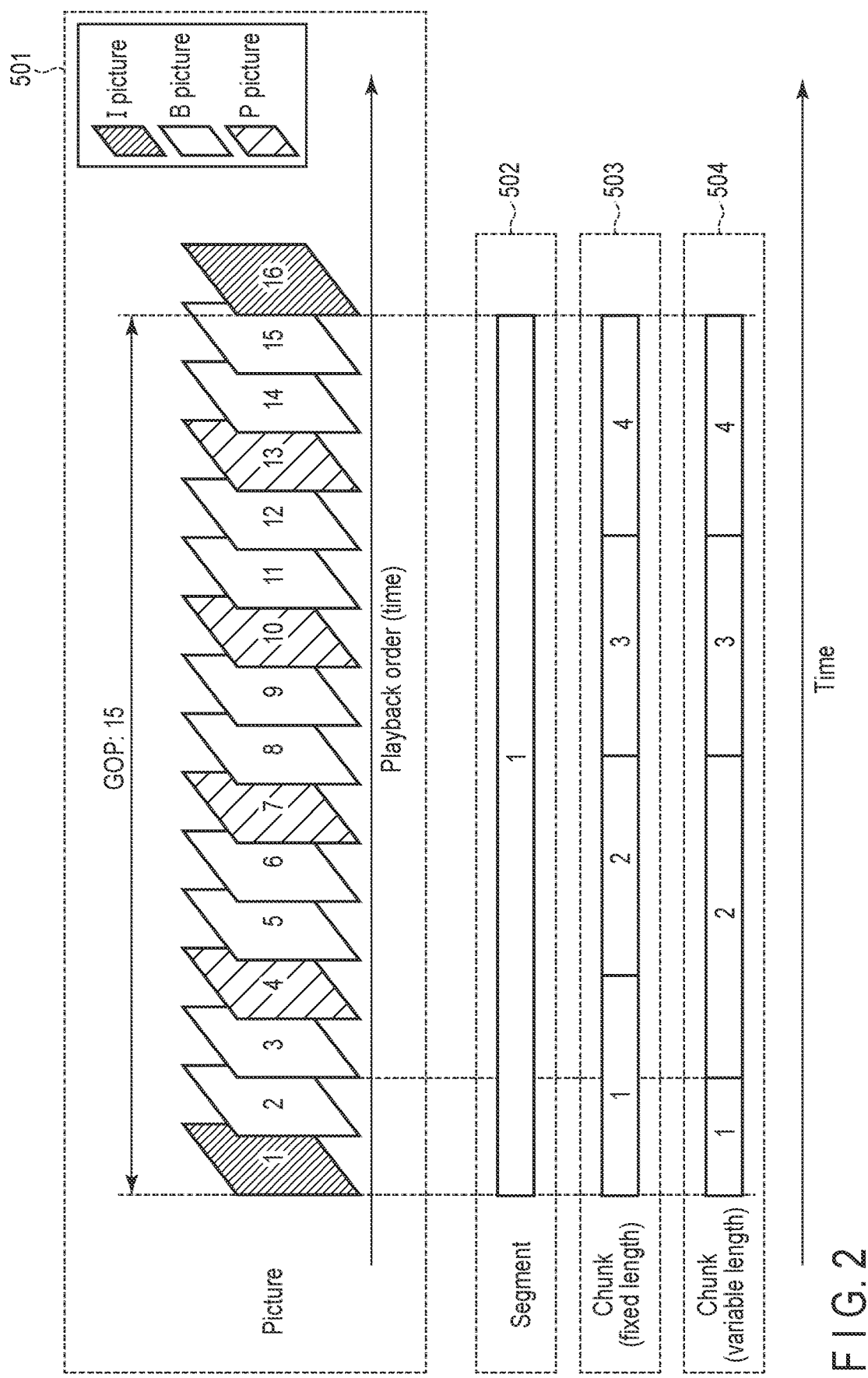
FIG. 2 is a schematic diagram illustrating a configuration example of streaming data according to an embodiment.

FIG. 2 is a schematic diagram illustrating a configuration example of streaming data according to the embodiment, and illustrates an example of general picture data, segment, chunk, and the like as a unit of video data and streaming data.

The server 1 receives, for example, video data output from a live video camera or the like, and the video encoding unit 11 encodes the received video data to be converted into encoded video data (picture data). Picture data 501 is an example in which generated pieces of picture data are arranged in an order of reproduction (time), and three types of examples are illustrated as picture data. The I picture, the B picture, and the P picture are general techniques and terms, and have the following features although details are not described. The I picture is a picture completed with one picture. The P picture is a difference image from a preceding I picture, and cannot be decoded unless the preceding I picture is referred to. The B picture cannot be decoded without referring to all the related preceding and succeeding pictures (I picture, B picture, P picture). A group of pictures from an I picture to a next I picture is referred to as a group of pictures (GOP). The picture data 501 is an example in which a B picture and a P picture are generated between 1 and 16 which are I pictures, and the GOP is 15. In the GOP unit, the GOP can be understood as a unit that can be decoded by always considering the I picture as a start. From the above characteristics, the I picture generally has a larger data amount (data size) than other pictures.

A segment 502 is a unit that can be decoded in the streaming of the video data, and is an example in a case where one segment includes 1 GOP. Chunks 503, 504 are examples of chunks defined by the Common Media Application Format (CMAF) which is a media format standard. In the chunk, a segment is divided into finer time lengths (generally less than one second) so that video data can be stored. The time length of the chunk may be referred to as a chunk length. The CMAF conforming server outputs and distributes streaming data for each chunk, thereby implementing low-latency video streaming. In the CMAF conforming segment generally used for low latency video distribution, a chunk length is a fixed length. The chunk 503 is an example in a case where the chunk length is set to a fixed length, and all the chunk lengths in the segment are the same (for example, 0.5 seconds). In general, a user or the like sets the chunk length with a time length (specified in seconds), but the chunk length can be understood as the number of pictures (the number of image frames) transmitted with the set time length. For example, in a case where the chunk length is set to one second, the chunk length can be understood as a value of the image frame rate (the number of transmission image frames per one second). In the present embodiment, the chunk length is a time length, and is determined by the streaming data generation unit 10 of the server 1, for example.

In a case where the chunk length is set to a fixed length, if the type of picture data or the type of media data stored for each chunk is different, the chunk length is the same, but a difference may occur in the data amount (data size). For example, since the data size of the I picture is generally larger than that of the P picture, the data size of the chunk in which the I picture is stored tends to increase as compared with the others (for example, the chunk in which only the P picture is stored). Therefore, the data size is different for each chunk, and there is a possibility that the time required to download the data varies for each chunk. In particular, there is a possibility of causing a large delay in downloading a chunk in which an I picture having a large data size is stored, and further, when a proxy server or the like is interposed, the influence may increase.

In the present embodiment, the chunk length (time length) in the segment is variable, and the server 1 determines the chunk length for each chunk and generates a chunk of the determined chunk length. The chunk 504 is an example in a case where the chunk length (time length) in the segment is variable, and there is a possibility that chunks having different chunk lengths are included in the same segment. The chunk length may be defined as the number of image frames instead of time.

Figure 3:
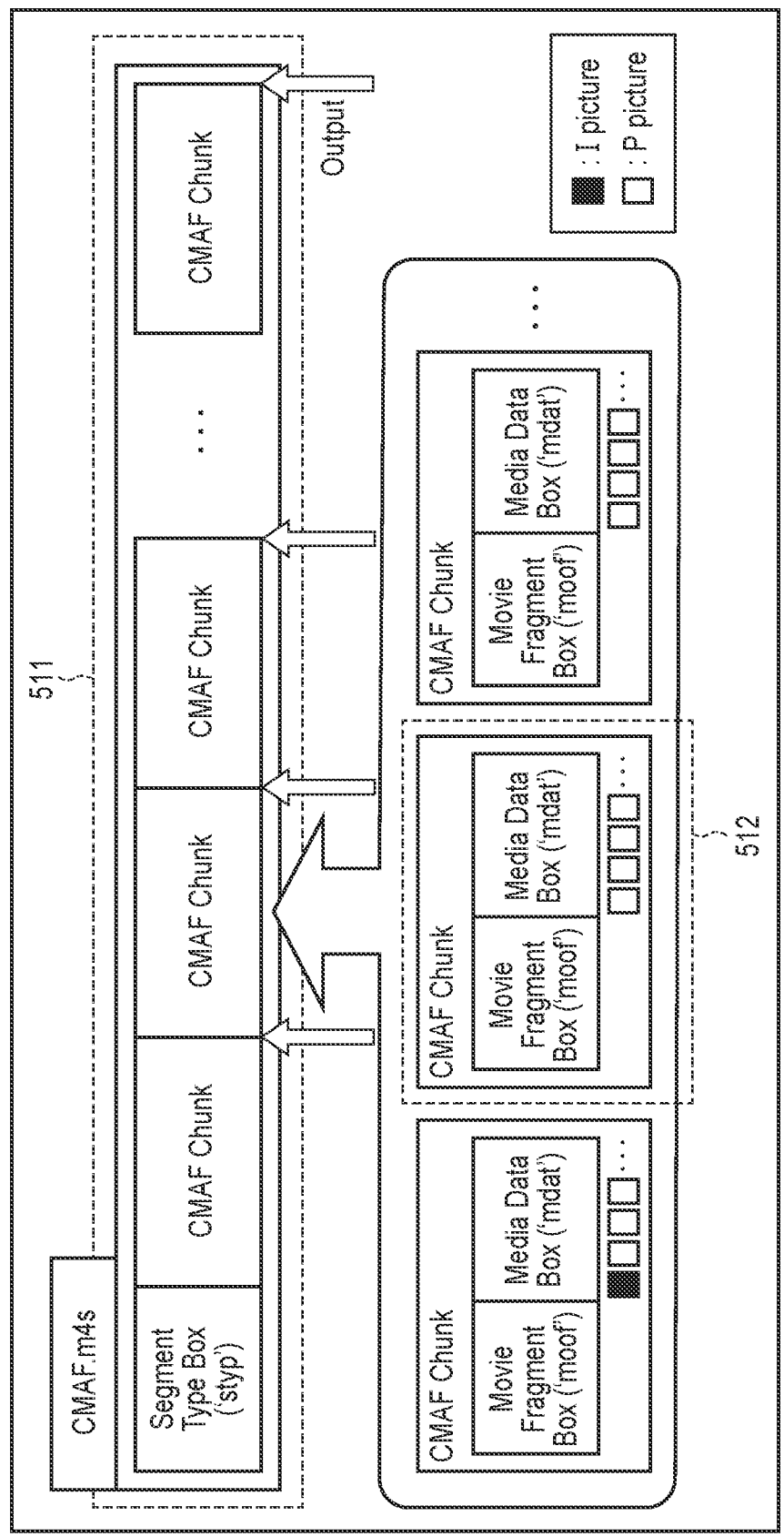
FIG. 3 is a diagram illustrating a data configuration of a segment and a chunk of streaming data according to an embodiment.

FIG. 3 is a diagram illustrating a data configuration of a segment and a chunk of streaming data according to the embodiment, and illustrates a data structure of a segment and a chunk conforming to CMAF. A segment 511 indicates a configuration of a segment, and in a CMAF conforming segment (CMAF.m4s), one or more chunks are stored subsequently to a header called a segment type box (styp) indicating a type of segment.

The chunk 512 indicates a configuration of a chunk, and each chunk includes one media data box (mdat) that stores a picture data body and one movie fragment box (moof) that stores meta information regarding the mdat. The moof can include information such as a data size of picture data stored in the mdat of the same chunk. The data size generally includes the data size of the moof. The server 1 outputs and distributes the streaming data for each chunk, and the viewer 20 inputs the acquired chunk to the decoding function to output the video content, so that the user can view the video content.

Figure 4:
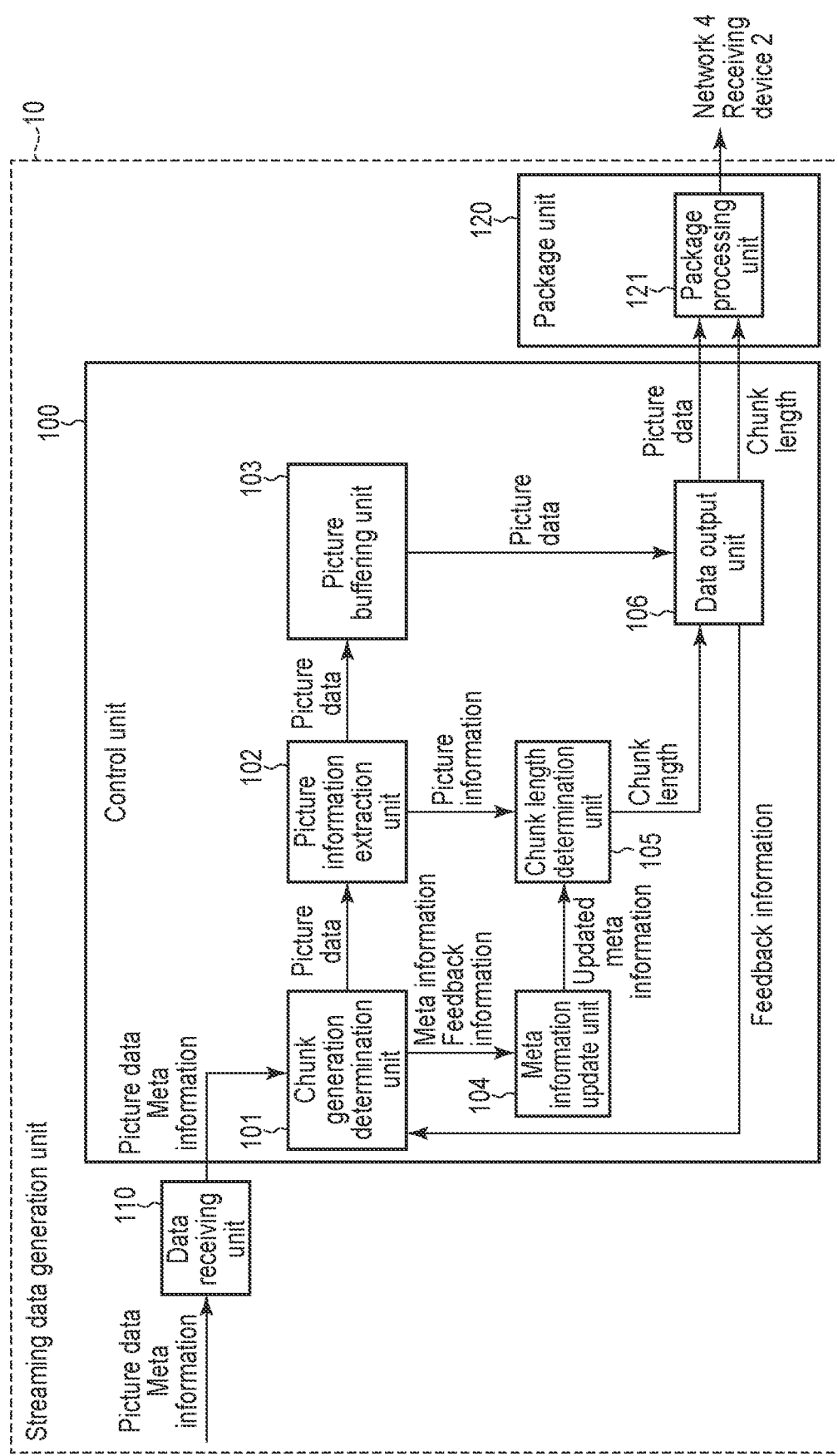
FIG. 4 is a functional block diagram illustrating a configuration example of a streaming data generation unit of a server according to an embodiment.

FIG. 4 is a functional block diagram illustrating a configuration example of a streaming data generation unit of a server according to an embodiment.

The streaming data generation unit 10 includes: means that receives picture data and meta information thereof for each piece of picture data; a control unit 100 that determines a chunk length of a chunk that stores the picture data according to the received information; and a package unit 120 that packages the picture data with the chunk length determined by the control unit 100 and outputs the packaged picture data as a chunk (or a segment).

The control unit 100 includes: a data receiving unit 110 that receives picture data and meta information; a chunk generation determination unit 101 that determines whether to generate a new chunk based on a data output situation (feedback information) input from a data output unit 106; a picture information extraction unit 102 that extracts picture information (a type of picture, a data size, or the like) from the picture data; a picture buffering unit 103 that temporarily stores the picture data; a meta information update unit 104 that updates the meta information based on the feedback information; a chunk length determination unit 105 that determines or calculates a chunk length for each chunk based on the updated meta information, the picture information, or the like; and the data output unit 106 that outputs the chunk length and the picture data to the package unit 120 and outputs the feedback information to the chunk generation determination unit 101.

The picture information is information such as a picture type and a data size, and may be extracted by analyzing picture data. The meta information is information such as resolution, a frame rate (image frame rate), an average bit rate, and a GOP of video data. The frame rate may be, for example, the number of image frames (the number of pictures) received by the data receiving unit 110 per one second. The average bit rate may be, for example, a second average of data sizes of all frames (pictures), an average for each chunk, or the like received by the data receiving unit 110 in the past. The average bit rate may be an average of picture data other than the I picture, and an arbitrary average bit rate can be defined. The feedback information is information generated and output by the data output unit 106, and may be, for example, information indicating how many chunks have been output in the segment. The data output unit 106 may output information on a timing at which the chunk is output to the package unit 120 as the feedback information.

The package unit 120 includes a package processing unit 121 that packages the picture data input from the data output unit 106 (stores the picture data in units of chunks) based on the chunk length received from the data output unit 106. Packaging data generated by the package processing unit 121 is basically data in units of chunks, and the data output according to the output timing of the package processing unit 121 may be in units of chunks or in units of segments. The package processing unit 121 outputs the packaging data to a communication unit (not illustrated) or the like, and outputs the packaging data from the communication unit to the network 4.

First Embodiment

In a first embodiment, an example is illustrated in which a server that generates and outputs streaming data determines a chunk length when generating a chunk.

FIG. 5 is a flowchart illustrating a processing operation example of a streaming data generation unit according to the first embodiment.

It is assumed that a user is viewing streaming content provided by the server 1 on the viewer 20 of the receiving device 2. For the streaming content, for example, video data captured by a live camera is received by the server 1 via the network 4, and is distributed to the receiving device 2 by the server 1. When receiving the video data, the server 1 encodes the video data by the video encoding unit 11 to obtain picture data. When receiving the picture data and the meta information, the data receiving unit 110 inputs the picture data and the meta information to the chunk generation determination unit 101 (step S101).

The chunk generation determination unit 101 determines whether to generate a new chunk (step S102). The determination of the generation of the new chunk may be performed based on the picture data and the meta information from the data receiving unit 110 or the feedback information from the data output unit 106. More specifically, the chunk generation determination unit 101 may determine that the chunk is newly generated when the data output unit 106 recognizes that the chunk or the segment is output based on the timing at which the chunk or the segment of the feedback information is output. The chunk generation determination unit 101 may analyze the picture data received by the data receiving unit 110, and may determine to newly generate a chunk, for example, when recognizing that a picture (for example, an I picture) having a large data amount has been received. The chunk generation determination unit 101 may analyze all the picture data received by the data receiving unit 110, or may analyze the picture data at an arbitrary timing. The chunk generation determination unit 101 may set a threshold or the like in advance in a memory (not illustrated) or the like, compare the threshold with the data size of the picture data, and determine the magnitude of the data amount. The chunk generation determination unit 101 may determine that a new chunk is generated depending on the type of the received picture data. For example, the chunk generation determination unit 101 may always determine to generate a new chunk when receiving an I picture.

The chunk generation determination unit 101 may determine whether to generate a new chunk depending on the data output situation when the feedback information related to the data output situation is acquired from the data output unit 106. Specifically, in a case where there is a large amount of chunk data stored in a buffer (which may be the picture buffering unit 103) (not illustrated) of the data output unit 106, the chunk generation determination unit 101 determines that the data transmission speed to the viewer 20 is low and determines to generate a new chunk. On the other hand, in a case where the amount of chunk data stored in a buffer (not illustrated) of the data output unit 106 is small, the chunk generation determination unit 101 may determine that the data transmission speed to the viewer 20 is high, and determine to refrain from generating a new chunk.

When determining to generate a new chunk, the chunk generation determination unit 101 transmits the picture data to the picture information extraction unit 102. The chunk generation determination unit 101 inputs the meta information acquired from data receiving unit 110 and the feedback information acquired from data output unit 106 to the meta information update unit 104 (YES in step S102).

The behavior of the picture information extraction unit 102 varies depending on the chunk generation of the chunk generation determination unit 101 in step S102. In a case where a new chunk is not generated, the picture information extraction unit 102 immediately inputs the picture data to the picture buffering unit 103 (NO in step S102, S106). On the other hand, in a case where a new chunk is generated, the picture information extraction unit 102 extracts the picture information from the picture data and inputs the picture information to the chunk length determination unit 105 (step S103), and the meta information update unit 104 receives the meta information and the feedback information from the chunk generation determination unit 101, updates the meta information based on the meta information and the feedback information, and inputs the result to the chunk length determination unit 105 (step S104). The processing in steps S103 and S104 may be performed in parallel.

Next, the chunk length determination unit 105 determines the chunk length of the newly generated chunk based on the updated meta information received from the meta information update unit 104, the picture information received from the picture information extraction unit 102, the feedback information, and the like (step S105). For example, when recognizing that a received picture is a picture (for example, an I picture) having a large data size from the picture information, the chunk length determination unit 105 may set the chunk length to be shorter than the chunk length set as the fixed length.

The chunk length determination unit 105 may recognize up to which picture data in the current segment is output as the chunk based on the video data information (resolution, frame rate, average bit rate, GOP length, and the like) acquired from the updated meta information and the feedback information (data output situation), and determine the chunk length according to the remaining data amount of the current segment. At this time, for example, the chunk length may be determined so that the number of bits (data amount, data size) included in one chunk does not exceed the average bit rate.

For example, when recognizing that the picture whose data is not output is only a picture having a small data size (for example, only a picture other than the I picture) from the feedback information, since the chunk size does not increase even if the chunk length is increased, the chunk length determination unit 105 may determine to set the chunk length of the newly generated chunk to be large. When determining that a picture (for example, an I picture) having a large data size is included in a picture whose data is not output and a picture having a large data size is included in a newly generated chunk from the feedback information, since the chunk size increases when the chunk length is increased and the delay time of download of the chunk in the receiving device 2 increases, the chunk length determination unit 105 may set the chunk length of the newly generated chunk to be short. When the chunk generation determination unit 101 determines that the data transmission speed from the server 1 to the viewer 20 is low, the chunk length determination unit 105 may set the chunk length to be shorter, for example, by setting the chunk length to be half the chunk length set as the fixed length.

When determining the chunk length, the chunk length determination unit 105 may consider the number of already output chunks in the same segment (which may be included in the feedback information). For example, when the chunk length is shortened, the transmission time of the chunk can be shortened, but the number of chunks in the segment increases. Since the metadata (moof of the chunk 512 in FIG. 3) is added to each chunk, the number of chunks increases and at the same time, the metadata which is overhead increases, and as a result, the amount of data (data size) to be transmitted in one segment increases. In such a case, the chunk length determination unit 105 desirably determines the chunk length so that the number of chunks does not increase so as to suppress the data amount in one segment as much as possible. That is, the chunk length determination unit 105 may determine the chunk length so as to increase the data size of one chunk as much as possible. In this case, the upper limit of the data size may be determined based on information such as an average bit rate. For example, in a case where the number of already output chunks in the same segment acquired from the feedback information is larger than a certain threshold, the chunk length determination unit 105 may determine the chunk length so as not to newly generate a chunk in the same segment thereafter.

The chunk length determination unit 105 may determine the chunk length in consideration of the video data information such as the resolution, the frame rate, and the average bit rate in the determination and setting processing of the chunk length. For example, in a case where the chunk generation determination unit 101 recognizes that the type of the picture whose data is not output in the segment is only a picture having a small data size (for example, only a picture other than an I picture), but at the same time, the average bit rate of each picture is high, the chunk length may be set to be shorter than the chunk length set as the fixed length regardless of the type of the picture.

The chunk length determination unit 105 may determine the chunk length according to the picture data to be stored for each chunk based on the type of the picture, the data size, and the like obtained from the picture information. Specifically, in a case where the chunk length determination unit 105 recognizes that the type of the received picture is an I picture having a large data size, it is conceivable to set the chunk length to be shorter, for example, to half the chunk length set as the fixed length.

As the chunk length, a data size of a picture to be stored in the newly generated chunk in the future may be estimated based on, for example, an average bit rate, and the chunk length may be determined based on the estimated data size. For example, the number of frames of a picture to be stored in the future may be determined such that the total number of bits estimated to be stored in a newly generated chunk (the data size of the chunk) does not exceed a preset first threshold. A second threshold for determining a threshold excess amount of the estimated data size may be set. In this case, even if the estimated data size exceeds the first threshold, if the estimated data size falls below the second threshold, the chunk length corresponding to the estimated data size is determined as the chunk length of the newly generated chunk. For example, several chunk lengths such as large, medium, and small may be determined in advance, and the chunk length may be automatically selected according to the type of the received picture, the feedback information, and the like. For example, the chunk length determination unit 105 may select "small" as the chunk length when the I picture is received. In a case where the chunk generation determination unit 101 determines, from the feedback information, that the data transmission speed from the server 1 to the viewer 20 is high, the chunk length determination unit 105 may select "long" as the chunk length.

The chunk length determination unit 105 may calculate the data output speed by the data output unit 106 from the feedback information and determine the chunk length according to the data output speed. Specifically, in a case where the data output speed of the data output unit 106 is high, the chunk length determination unit 105 may determine that the data transmission speed from the server 1 to the viewer 20 is high and make the chunk length as long as possible, and in a case where the data output speed of the data output unit 106 is low, the chunk length determination unit may determine that the data transmission speed from the server 1 to the viewer 20 is low and make the chunk length as short as possible.

The picture buffering unit 103 stores the picture data in the buffer in the order of the received picture data (step S106). The data output unit 106 determines whether to output data in a chunk (step S107). Specifically, the data output unit 106 may determine to output the chunk when receiving the chunk length from the chunk length determination unit 105. When determining not to output the chunk, the data output unit 106 performs receiving processing of the next picture data (NO in step S107). When determining to output data, the data output unit 106 extracts the picture data corresponding to the determined chunk length from the picture buffering unit 103, and outputs the chunk length and the picture data to the package unit 120 (step S108). At the same time, the data output unit 106 outputs, to the chunk generation determination unit 101, feedback information of the data output situation such as how much the chunk in the current segment has been output and how much the B picture and the P picture have been output after the segment or the I picture at the head of the GOP (step S109).

When receiving the chunk length and the picture data, the package processing unit 121 packages the received picture data with the received chunk length, and generates and outputs a chunk (or segment) (step S110). Since the chunk segment output by the above procedure conforms to the CMAF format, the viewer 20 of the receiving device 2 can receive the chunk generated and output according to the present embodiment and display the streaming content without particularly requiring correction as long as the chunk segment conforms to the CMAF format, for example.

As described above, the server 1 can eliminate the variation in the data size between the chunks to be output by variably setting the chunk length, and it is possible to prevent a large delay due to a specific chunk having a large data size at the time of download by the receiving device 2.

When a network of a company or a local government is connected to the Internet, it is usually necessary to pass through a plurality of proxy servers, and there is a possibility that a communication response is affected (delayed) by passing through the proxy server. Since the chunk division in the segment is generally performed in units of time and with a fixed length, it takes time to acquire a specific chunk having a large data size, but the influence becomes large particularly when a proxy server is used, and there is a case where low-delay video distribution intended by CMAF cannot be performed. In the present embodiment, the effect is particularly remarkable under a network environment via such a proxy server, and low-delay video distribution can be performed.

Figure 6:
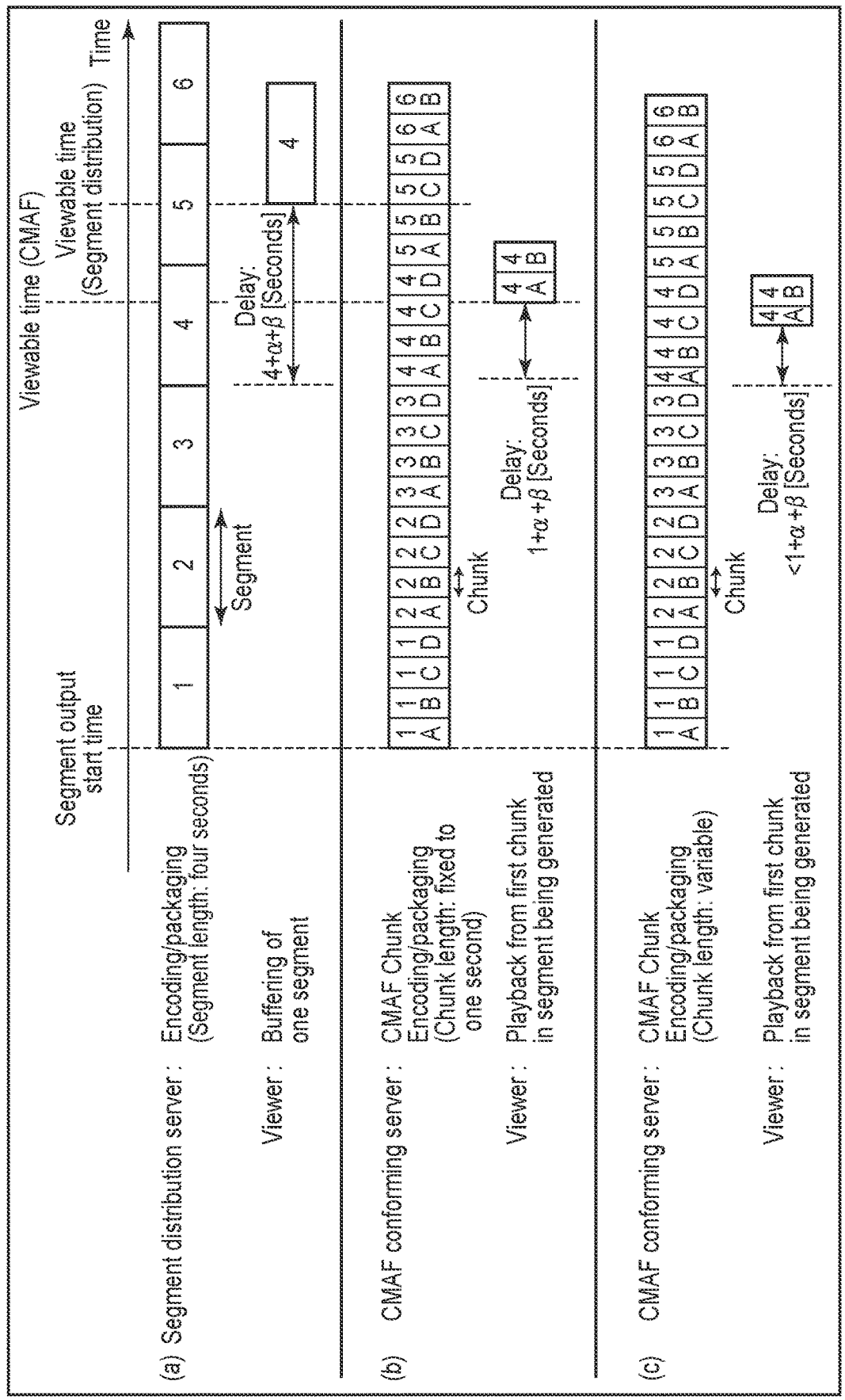
FIG. 6 is a diagram illustrating a relationship between server transmission and viewer reception of the streaming data according to the first embodiment.

FIG. 6 is a diagram illustrating a relationship between server transmission and viewer reception of the streaming data according to the first embodiment. FIG. 6, part (a) illustrates an example by segment distribution (segment length is four seconds), FIG. 6 part (b) illustrates an example of distribution of a chunk having a fixed length in a CMAF conforming format (segment length is four seconds, chunk length is one second), and FIG. 6, part (c) illustrates an example of distribution according to the present embodiment in a case where the chunk has a variable length in the CMAF conforming format.

As illustrated in FIG. 6, part (a), in the segment distribution method, 4+α+β seconds are required after the server generates and transmits the segment 4 until the viewer receives the segment 4 and the segment 4 becomes viewable by the user. This breakdown is a transmission time of four seconds by the server of the segment 4, a network delay of α seconds including processing by proxy or the like, and a processing time of β seconds such as a download time of a viewer other than the above.

As illustrated in FIG. 6, part (b), in a case where the chunk length is fixed, 1+α+β seconds are required after the server generates and transmits the chunk 4A of the segment 4 until the viewer receives the chunk 4A and the chunk 4A becomes viewable by the user. This breakdown is a transmission delay time of one second by the server of the chunk 4A, a network delay of α seconds including processing by proxy or the like, and a processing time of β seconds such as a download time of a viewer other than the above. Accordingly, in FIG. 6 part (b), as compared with FIG. 6, part (a), the transmission time by the server, the network delay of α seconds, and the processing time of β seconds are shortened, and the viewable time of the chunk 4A (corresponding to the head portion of the segment 4) is improved.

FIG. 6, part (c) illustrates an example in which the chunk length of the chunk 4A in FIG. 6, part (b) according to the present embodiment is shortened, and the transmission delay time by the server is shorter than one second illustrated in FIG. 6, part (b) by the shortened chunk length of the chunk 4A. As similar to this, since the network transmission delay of α seconds also decreases when the size of data to be transmitted is reduced, it is possible to reduce the network transmission delay of α seconds in FIG. 6 part (c) as compared with the case of FIG. 6, part (b). This effect is particularly remarkable, for example, when the proxy server 3 is used for data transmission from the server 1 to the receiving device 2. As similar to this, since the processing delay of β seconds also decreases when the size of data to be transmitted is reduced, it is possible to reduce processing delay of β seconds in FIG. 6, part (c) in the present embodiment as compared with the case of FIG. 6, part (b). Accordingly, in FIG. 6, part (c), as compared with FIG. 6, part (b), the transmission time by the server, the network delay of α seconds, and the processing time of β seconds are shortened, and the viewable time of the chunk 4A is improved.

Figure 7:
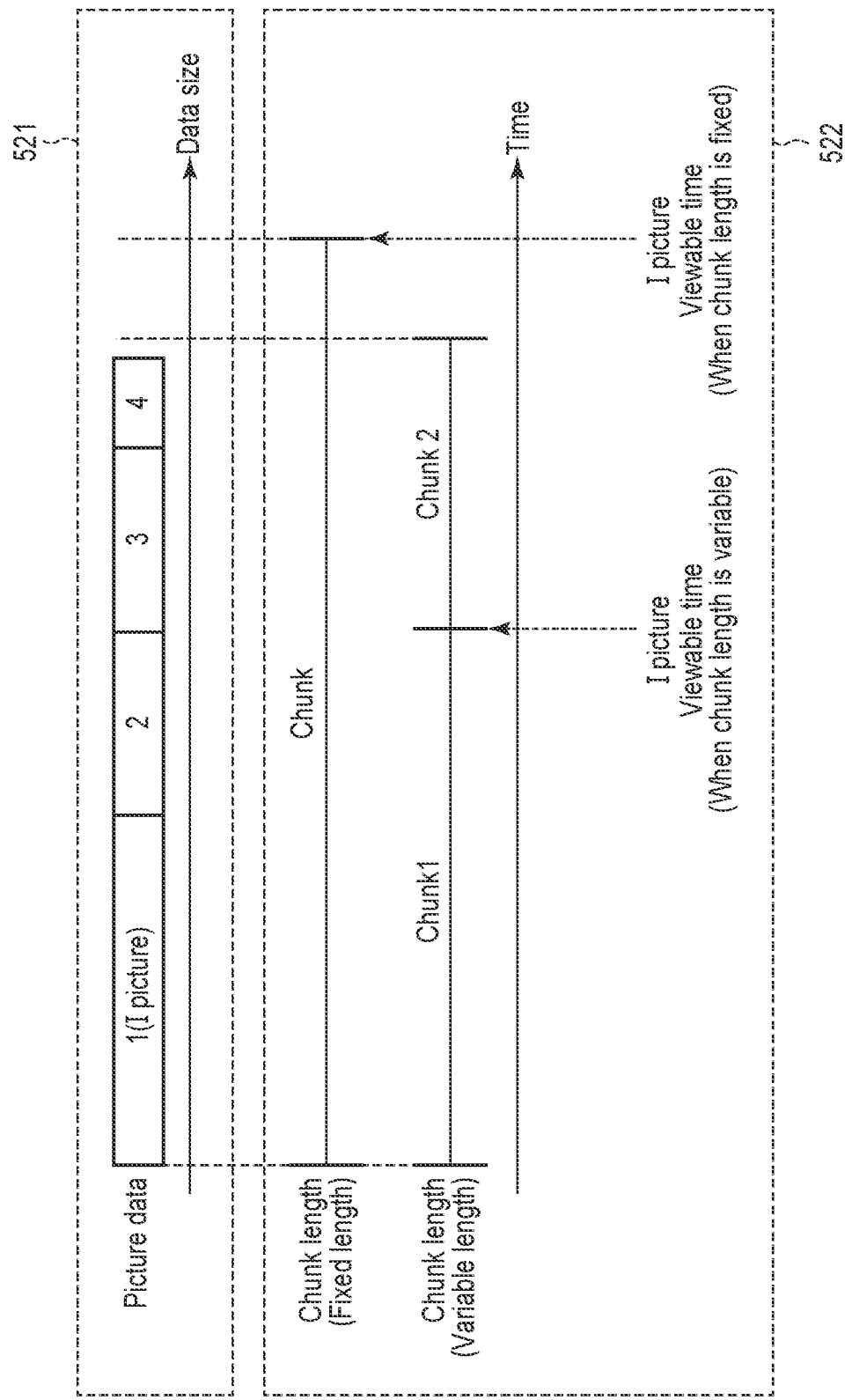
FIG. 7 is a diagram illustrating a viewable time of a chunk according to the first embodiment.

FIG. 7 is a diagram illustrating a viewable time of a chunk according to the first embodiment.

Picture data 521 is an example of pictures continuous from an I picture which is picture 1 with a horizontal axis as a data size. The picture 2 and subsequent pictures are, for example, B pictures or P pictures. In the picture data 521, each horizontal width of each picture indicates a data size, indicating that the data size of the picture 1, which is an I picture, is the largest. A chunk 522 illustrates an example of each chunk when the chunk length of the picture data 521 is a fixed length and a variable length in a case where the horizontal axis is time. When the chunk 522 has a fixed length, the picture data 521 is stored in one chunk. In a case where the chunk 522 has a variable length, the picture data 521 is divided into two or more chunks with the chunk length set in step S105 in FIG. 5. In the chunk 522, it is indicated that the viewable time by the user can be made shorter in a case where the chunk length is a variable length than in a case where the chunk length is a fixed length.

Figure 8:
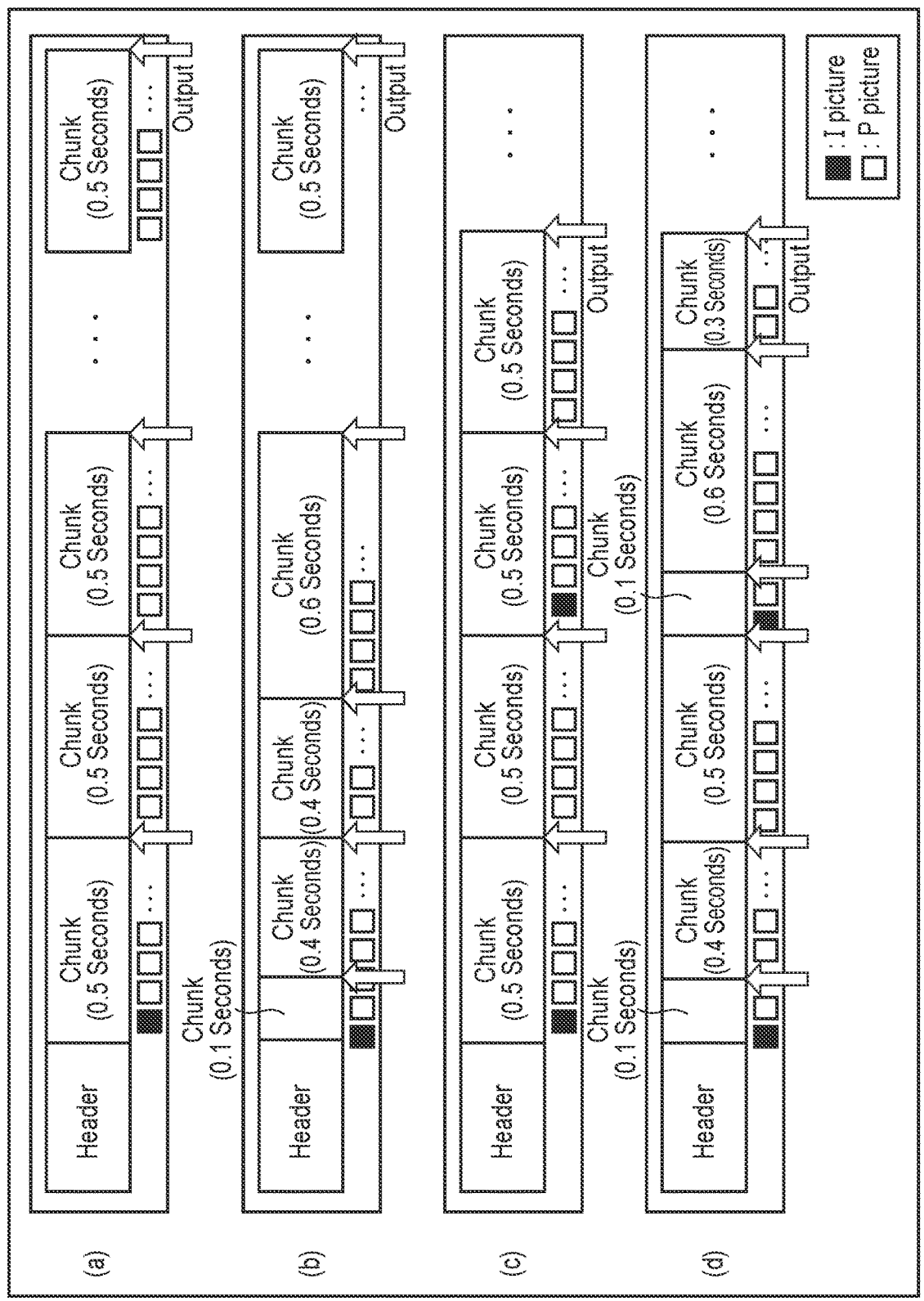
FIG. 8 is a diagram illustrating an example of a relationship between a segment and a chunk of streaming data according to the first embodiment.

FIG. 8 is a diagram illustrating an example of a relationship between a segment and a chunk of streaming data according to the first embodiment. FIG. 8, part (a) is an example of a segment chunked with a fixed length, and FIG. 8, part (b) is an example of a segment chunked with a variable length.

As illustrated in FIG. 8, part (a), in the segment chunked with the fixed length, all the chunks are set to the fixed length (0.5 seconds in this example). On the other hand, as illustrated in FIG. 8, part (b), since the segment according to the present embodiment is formed into a chunk with a variable length, chunks having different chunk lengths are included. For example, a chunk in which an I picture having a large data size is stored is short (0.1 seconds in FIG. 5), and other chunks are chunks having a chunk length determined by the flowchart of FIG. 5. Depending on the type and data size of the picture data to be continuously transmitted, the chunk length may be larger than 0.5 seconds and 0.6 seconds, or may be smaller than 0.5 seconds. However, regarding the data size of each chunk, in step S105 of FIG. 5, for example, by determining the chunk length using the average bit rate as a threshold, it is possible to suppress variation in the data size of the chunk to be small.

FIG. 8, part (c) and part (d) illustrate examples of a case where there are a plurality of pieces of data (for example, I pictures) having a large data size in one segment, FIG. 8, part (c) illustrates an example of a case where a segment is chunked with a fixed length, and FIG. 8, part (d) illustrates an example of a case where a segment is chunked with a variable length. In step S102 of FIG. 5, by determining whether to generate a chunk based on the type of the picture data from the data receiving unit 110, even in a case where the I picture is included in the middle of the segment as illustrated in FIG. 8, part (d), the chunk length for storing the I picture can be variably set, and variation in the data size for each chunk can be suppressed. Since the case as illustrated in FIG. 8, part (d) is possible according to the present embodiment, it is possible to partition chunks in GOP units on the assumption of content acquisition (HTTP Range GET or the like) from the middle of the segment in addition to delivery from the first chunk of the segment by HTTP/1.1 GET or the like. As a result, the viewer 20 can decode, output, and display the picture data of the received chunk without waiting for a plurality of chunks.

As described above, in the present embodiment, the chunk or the segment having the structure conforming to each low latency media format such as CMAF is output by the package processing unit 121, so that it is possible to view the low latency video streaming content in units of chunks without the need for modification or the like in a standard environment such as a browser, in the receiving device 2.

As described above, according to the server 1 (streaming data generation unit 10) of the first embodiment, it is possible to distribute the video streaming content with a low delay by setting the chunk length for each chunk and packaging.

Second Embodiment

In the present embodiment, an example will be described in which the chunk length is determined immediately before the picture data is output from the data output unit 106.

Figure 9:
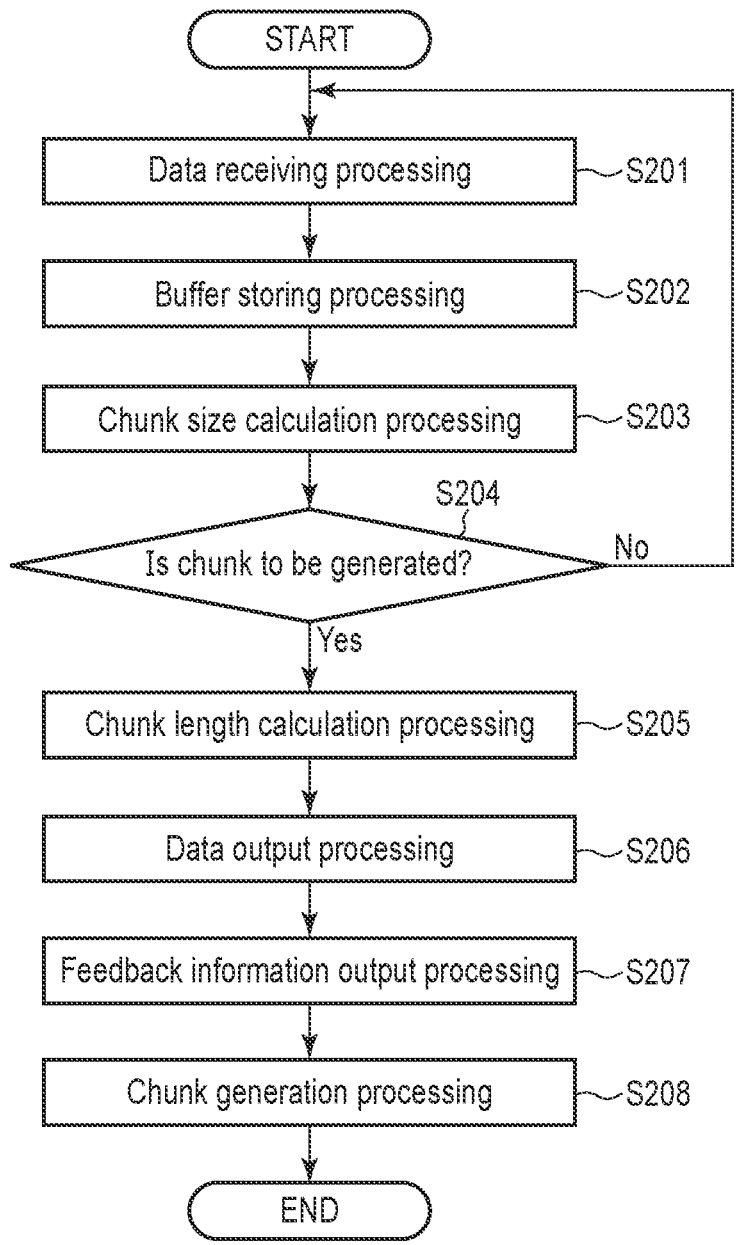
FIG. 9 is a flowchart illustrating a processing operation example of a streaming data generation unit according to a second embodiment.

FIG. 9 is a flowchart illustrating a processing operation example of a streaming data generation unit according to a second embodiment.

As similar to the first embodiment, when receiving the video data, the server 1 encodes the video data by the video encoding unit 11 to obtain picture data. When receiving the picture data and the meta information, the data receiving unit 110 inputs the picture data and the meta information to the chunk generation determination unit 101 (step S201). The chunk generation determination unit 101 stores the received data in the picture buffering unit 103 (step S202). The chunk generation determination unit 101 counts the data size of all the received pictures and the number of pictures (step S203). The chunk generation determination unit 101 provides a threshold in a memory (not illustrated), and determines to generate a chunk at a timing when the counted data size exceeds the threshold (YES in step S204). The chunk generation determination unit 101 calculates the chunk length from the count value of the number of pictures and the image frame rate when it is determined to generate the chunk (step S205). Step S206 and the subsequent steps are similar to step S108 and the subsequent steps in FIG. 5, and thus description thereof is omitted. The threshold used by the chunk generation determination unit 101 in step S204 may be set in advance, or for example, an average bit rate to be calculated may be sequentially set as the threshold.

According to the above procedure, the server 1 (streaming data generation unit 10) can determine the chunk length immediately before generating the chunk based on the chunk size.

According to at least one embodiment as described above, it is possible to provide a streaming server, a transmission method, and a program for streaming video distribution that determine a chunk length for each chunk of streaming data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Furthermore, in each constituent element of the claims, a case where a constituent element is divided and expressed, a case where a plurality of constituent elements are expressed together, or a case where a plurality of constituent elements are expressed in combination is also within the scope of the present invention. In addition, a plurality of embodiments may be combined, and examples configured by this combination are also within the scope of the invention. In addition, some components may be deleted from all the components illustrated in the embodiment. Furthermore, the components of different embodiments may be appropriately combined.

In addition, in order to make the description clearer, the drawings may schematically represent the width, thickness, shape, and the like of each part as compared with an actual aspect. In the block diagram, data and signals may be exchanged between blocks that are not connected or in a direction in which an arrow is not shown even if the blocks are connected. The processing illustrated in the flowchart, the sequence chart, or the like may be implemented by software (such as a program) operated by hardware such as an IC chip or a digital signal processor (Digital Signal Processor or DSP) or a computer including a microcomputer, or a combination of hardware and software. The device of the present invention is also applied to a case where a claim is expressed as a control logic, a case where a claim is expressed as a program including an instruction for executing a computer, and a case where a claim is expressed as a computer-readable recording medium describing the instruction. In addition, names and terms used are not limited, and even other expressions are included in the present invention as long as they have substantially the same content and the same purpose.

What is claimed is:

1. A streaming server which is used to reduce a processing delay of a proxy server in a network environment via the proxy server and compliant with the Common Media Application Format (CMAF) for outputting chunk data obtained by dividing a segment, which is a transmission unit of picture data, into chunks, which are transmission units smaller than the segment, as streaming data, the streaming server comprising:
   a chunk length determination unit that calculates a chunk length which is a time length of the chunk; and
   a data generation unit that generates the chunk data by dividing segment data, which is data of the segment, into the chunks in accordance with the chunk length,
   wherein the chunk length determination unit determines the chunk length based on a data size of picture data to be included in the chunk, and
   when the chunk length determination unit recognizes that a received picture is an I picture, the chunk length determination unit sets the chunk length to be shorter than a chunk length set as a fixed length.

2. The streaming server according to claim 1, further comprising a chunk generation determination unit that determines whether to generate a new chunk every time the picture data is received.

3. The streaming server according to claim 2,
   wherein the chunk length determination unit determines a chunk length for each of the chunks.

4. The streaming server according to claim 2, wherein the chunk generation determination unit determines whether to generate the new chunk according to a type of the picture data.

5. The streaming server according to claim 2,
   wherein the chunk generation determination unit determines whether to generate the new chunk based on an output situation of the chunk data.

6. The streaming server according to claim 2, wherein the chunk generation determination unit determines whether or not to generate the new chunk based on the type of the picture data that has not been output in the segment.

7. The streaming server according to claim 2, wherein the chunk generation determination unit determines whether to generate the new chunk based on output status of the chunk data within the segment.

8. The streaming server according to claim 1, wherein the chunk length determination unit determines the chunk length based on an output situation of the chunk data.

9. The streaming server according to claim 1, wherein the chunk length determination unit determines the chunk length based on a number of output chunks among the chunks in the segment.

10. The streaming server according to claim 9, wherein when the number of output chunks exceeds a threshold, the chunk length determining unit determines the chunk length so as not to generate new chunks for the same segment.

11. The streaming server according to claim 1, wherein the chunk length determination unit determines the chunk length based on an amount of segment data that has not yet been output in the segment.

12. The streaming server according to claim 1, wherein the chunk length determination unit determines the chunk length so that an amount of data included in one chunk does not exceed an average bit rate for each chunk calculated based on previously received picture data.

13. A transmission method of streaming data conforming to the Common Media Application Format (CMAF) for reducing a processing delay of a proxy server in a network environment via the proxy server and for outputting chunk data obtained by dividing a segment, which is a transmission unit of picture data, into chunks, which are transmission units smaller than the segment, as streaming data, the transmission method comprising:

calculating a chunk length which is a time length of the chunk;

generating the chunk data by dividing segment data, which is data of the segment, into chunks in accordance with the chunk length;

determining the chunk length based on a data size of picture data to be included in the chunk; and when recognizing that a received picture is an I picture, setting the chunk length to be shorter than a chunk length set as a fixed length.

14. A non-transitory computer-readable medium having instructions for reducing a processing delay of a proxy server in a network environment via the proxy server, wherein the instructions, when executed by a computer, cause the computer to:

transmit streaming data conforming to the Common Media Application Format (CMAF) for outputting chunk data obtained by dividing a segment, which is transmission unit of picture data, into chunks, which are transmission units smaller than the segment, as the streaming data;

calculate a chunk length which is a time length of the chunk;

generate the chunk data by dividing segment data, which is data of the segment, into chunks in accordance with the chunk length;

determine the chunk length based on a data size of picture data to be included in the chunk; and when recognizing that a received picture is an I picture, set the chunk length to be shorter than a chunk length set as a fixed length.

* * * * *

UNITED STATES PATENT AND TRADEMARK OFFICE
CERTIFICATE OF CORRECTION

| | | |
|---|---|---|
| PATENT NO. | : 11,910,033 B2 | Page 1 of 1 |
| APPLICATION NO. | : 17/682801 | |
| DATED | : February 20, 2024 | |
| INVENTOR(S) | : Yu Mizoguchi et al. | |

It is certified that error appears in the above-identified patent and that said Letters Patent is hereby corrected as shown below:

In the Claims

In Claim 10, Column 13, Line 17, "for the same segment." should read --for the segment.--.

Signed and Sealed this
Eleventh Day of June, 2024

Katherine Kelly Vidal
*Director of the United States Patent and Trademark Office*